United States Patent
Hable et al.

(10) Patent No.: US 9,404,015 B2
(45) Date of Patent: Aug. 2, 2016

(54) MULTIFUNCTIONAL COATINGS FOR FASTENERS

(71) Applicant: ND Industries, Inc., Clawson, MI (US)

(72) Inventors: Christopher T. Hable, Romeo, MI (US); Norman M. Rawls, Shelby Township, MI (US); Brian J. Phillips, Orion Township, MI (US); Desiree N. Snyder, Warren, MI (US)

(73) Assignee: ND Industries, Inc., Clawson, MI (US)

( * ) Notice: Subject to any disclaimer, the term of this patent is extended or adjusted under 35 U.S.C. 154(b) by 182 days.

(21) Appl. No.: 14/153,842

(22) Filed: Jan. 13, 2014

(65) Prior Publication Data

US 2014/0199135 A1  Jul. 17, 2014

Related U.S. Application Data

(60) Provisional application No. 61/752,760, filed on Jan. 15, 2013.

(51) Int. Cl.
| | |
|---|---|
| *F16B 35/04* | (2006.01) |
| *C09D 163/10* | (2006.01) |
| *F16B 39/00* | (2006.01) |
| *C09D 133/10* | (2006.01) |
| *C09D 163/04* | (2006.01) |
| *C09D 153/00* | (2006.01) |
| *C09D 123/12* | (2006.01) |
| *C09D 179/00* | (2006.01) |
| *C09D 7/12* | (2006.01) |
| *C09D 5/00* | (2006.01) |
| *C08K 9/10* | (2006.01) |

(52) U.S. Cl.
CPC .............. *C09D 163/10* (2013.01); *C09D 5/00* (2013.01); *C09D 7/125* (2013.01); *C09D 123/12* (2013.01); *C09D 133/10* (2013.01); *C09D 153/00* (2013.01); *C09D 163/04* (2013.01); *C09D 179/00* (2013.01); *F16B 39/00* (2013.01); *C08K 9/10* (2013.01); *Y10T 29/49826* (2015.01); *Y10T 29/49888* (2015.01)

(58) Field of Classification Search
CPC ...... C09D 63/10; C09D 7/125; C09D 133/10; C09D 123/12; C09D 153/00; F16B 39/00
USPC ................. 411/424, 82.2, 903, 930
See application file for complete search history.

(56) References Cited

U.S. PATENT DOCUMENTS

| | | | | | |
|---|---|---|---|---|---|
| 2,939,805 | A | * | 6/1960 | Johnson | F16B 33/06 411/258 |
| 3,061,455 | A | * | 10/1962 | Anthony | F16B 33/06 156/281 |
| 3,746,068 | A | * | 7/1973 | Deckert | F16B 33/06 411/258 |
| 4,316,784 | A | * | 2/1982 | Buchwalter | C09D 5/4434 204/506 |
| 6,235,800 | B1 | * | 5/2001 | Kyuno | B01J 13/025 521/51 |
| 6,830,799 | B1 | * | 12/2004 | Duffin | B29C 44/184 428/131 |
| 7,600,957 | B2 | * | 10/2009 | Phillips | C08G 59/5026 411/82.2 |
| 7,771,148 | B2 | | 8/2010 | Phillips | |
| 2004/0022951 | A1 | | 2/2004 | Maurus | |
| 2005/0137298 | A1 | | 6/2005 | Schneider | |
| 2007/0122628 | A1 | * | 5/2007 | Phillips | C08G 59/5026 428/413 |
| 2009/0298997 | A1 | | 12/2009 | Baumgart et al. | |
| 2011/0200756 | A1 | * | 8/2011 | Flosbach | C08G 18/3206 427/379 |
| 2014/0288217 | A1 | * | 9/2014 | Hatanaka | C08K 3/22 524/100 |

FOREIGN PATENT DOCUMENTS

| | | |
|---|---|---|
| DE | 102005053663 A1 | 5/2007 |
| IE | 102007034865 A1 | 1/2009 |
| WO | WO2007130856 A2 | 11/2007 |
| WO | WO2012012675 A1 | 1/2012 |

OTHER PUBLICATIONS

PCT/US2014/011417 International Search Report dated Mar. 21, 2014, 4 pages.
English language abstract and machine translation for DE102007034865 A1 extracted from http://worldwide.espacenet.com database on May 10, 2016, 40 pages.

* cited by examiner

*Primary Examiner* — Gary Estremsky
(74) *Attorney, Agent, or Firm* — Warner Norcross & Judd LLP

(57) ABSTRACT

A coating composition adapted for application on a fastener, the coating composition composed of a binder component composed of a polymeric resin present in the composition at a concentration between 1.0% and 15.0% by total composition weight, wherein the binder component is composed of at least one of a solvent dispersible compound; a reactive cross-linking component present in the composition in an amount between 1.0% and 80.0%; at least one curing agent; optionally at least one expansion agent, wherein at least one of the curing agent or the reactive cross-linking component are physically and reactively isolated from other components of the composition.

16 Claims, No Drawings

MULTIFUNCTIONAL COATINGS FOR FASTENERS

TECHNICAL FIELD

The present invention relates to coating compositions that can be employed on surfaces of devices, such as those of fasteners and plugs, and more particularly, to coating compositions that are designed and formulated to perform two or more functions in a single coating when the associated device is in a use position or configuration, for example, when the fastener or plug is engaged with an aperture defined by a work piece.

BACKGROUND OF THE INVENTION

In many applications, fasteners provide an efficient means for mechanically joining two parts together. Some fasteners can be of the self-locking type. Self-locking functionality may be achieved by using a special coating patch that is adhered to all or a portion of the fastener surface. The fastener may include other coatings to control torque tension behavior or to provide consistent clamping force at a specific force. The coating may be present as a masking element to prevent damage or contamination fouling to the fastener prior to application of a nut. Such contamination may occur during certain coating and painting processes. Such coatings may also provide anti-seizing functions. In other cases, a coating may be applied to enhance sealing between the mechanical fastener and the aperture in which it is inserted to prevent intrusion of fluids, gasses or particulate matter in a cavity or to retain fluids or gasses within the cavity.

Functional coatings may be present on plugs to provide locking, lubrication, anti-seizing, masking or sealing. In certain instances, the locking function can be minimized to permit removal of the fastener or plug without special tools or treatment such as heating so as to prevent destruction of the fastener or plug or the associated aperture. In such situations, compositions with a low (e.g. less than 75 in. lbs.) or medium (e.g. 75-150 in. lbs.) breakaway torque is suitable, for example, on an M10 fastener or plug.

In some applications, the coating on the fastener or plug can perform more than one of the functions mentioned above imparted by a single coating composition. While some coating compositions may perform in a manner that provides locking and some fluid resistance functions, such composition's dual functionality or multiple functionality is possible only in very limited applications. In a large number of applications, the composition is limited to single functionality. To provide a fastener or plug with multiple functionalities, the part typically is separately coated multiple times, in multiple steps with multiple compositions. Accordingly, there remains room for improvement to provide a single coating for a fastener or plug that can serve multiple functions, and/or to provide a coating composition that provides enhanced single function properties where desired.

SUMMARY OF THE INVENTION

A coating composition adapted for application on a fastener device is provided. The coating composition can include multiple components that are selectively isolated for later release and reaction with other components to provide enhanced or multiple functionalities for the fastener.

In one embodiment, the coating composition can comprise a binder component composed of a polymeric resin present in the composition at a concentration between 1.0% and 30.0% by total composition weight, wherein the binder component is composed of at least one of a solvent dispersible compound; a reactive cross-linking component present in the composition in an amount between 1.0% and 80.0% by total composition weight; at least one curing agent; optionally at least one expansion agent, wherein at least one of the curing agent and the reactive cross-linking component are present in the composition, but physically and reactively isolated from the binder component, and optionally one another, and/or other components of the composition.

In another embodiment, a fastener is provided that includes the composition coated over at a surface of the fastener. The coating composition can include multiple components or ingredients with multiple functionalities. For example, the coating composition can include the above-mentioned curing agent and reactive cross-linking component. These components can be isolated from one another, the binder component and/or other components of the composition to prevent reaction of those components until a preselected event. For example, the curing agent can be microencapsulated and the reactive cross-linking component can be separately microencapsulated, with both disposed and intermixed in the binder. The microcapsules can be formulated so that they rupture upon the application of a force or pressure, such as that encountered when applying a fastener or plug to an aperture. In turn, this releases the multiple different components of the composition so that they can react with one another and other components, such as the binder. Upon reaction, the reactive agent and curing agent can provide a desired first functionality, such as a locking functionality when the composition is applied to a fastener to lock the fastener in place.

In still another embodiment, the composition, either by itself or disposed on the fastener, can include an expansion agent, such as a blowing agent which causes the coating or composition to expand upon installation within an aperture of a work piece. In turn, this seals or otherwise fills the gaps between certain threads of the fastener or plug and the aperture to provide a second functionality, such as sealing and/or expanding functionality.

In even another embodiment, the composition, either by itself or disposed on the fastener, can include a lubricant such as wax, oil, molybdenum or other lubricating compounds. The lubricant can impart yet another functionality to the fastener, namely, lubrication. Such lubrication can be helpful when initially installing a fastener such as a self-tapping fastener.

In yet another embodiment, the fastener can include the above-noted coating composition. The curing agent and reactive cross-linking component can be present in the composition but physically and reactively isolated from one another, the binder component and other components of the composition, with the curing agent and reactive cross-linking component being disposed in separate physical layers. These layers can be applied in specific sequence from the surface of the fastener of the outermost coating.

In a further embodiment, a method is provided for producing a sealed junction between a fastener and an associated aperture. The method can include inserting the fastener with the coating composition disposed on a surface thereof, for example, on threads, and which surface is brought in to shearing engagement with a corresponding surface of the aperture. The shearing force or pressure, due to the installation, causes the reactive component, the curing agent and/or an optional expansion agent to become exposed to one another, the binder or other components in the composition. Upon such exposure and elimination of the previous isolation, these components undergo chemical reactions and/or physical alteration. Thus, the previously isolated components can react and provide two or more functions in the single coating composition when the fastener is in a use position or configuration relative to the aperture or work piece.

The present invention provides a coating composition that is formulated to perform two or more functions in a single coating when the associated device, for example, a fastener or plug, is installed or otherwise in use. With the multiple functionalities in such a coating, additional process steps can be eliminated to add other components with different functionalities can be eliminated.

These and other objects, advantages, and features of the invention will be more fully understood and appreciated by reference to the description of the current embodiment and the drawings.

Before the embodiments herein are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Coatings for fasteners and plugs provide multiple functions in a single coating. The single coating composition may be selected to provide two or more functions for improve plug and/or fastener performance. These functions include but are not limited to any combination of two or more of the following: lubrication, thread locking, anti-galling or anti-seizing, and sealing. The composition disclosed herein can be employed to achieve sealing even on poorly fitting plugs and fasteners through a unique set of ingredients that provides for expansion of the coating, where an expansion agent is included in the coatings. While expansion may not be required for sealing in all applications, for example in plugs and fasteners with tight tolerances, the coatings as disclosed herein are particularly suited to sealing assemblies of parts with high tolerances or when the tolerances or part sizes are highly variable.

As broadly construed, the coating composition disclosed herein will include a polymeric binder, a reactive cross-linking component and a curing agent. The polymeric binder will be a compound or compounds that disperse in water or an organic solvent together with the reactive cross-linking component. The reactive cross-linking component will be a compound or compounds capable of forming 3-dimensional bonds when present in combination with the polymeric binder and the curing agent.

The coating composition in the as applied unreacted state can contain at least one polymeric binder in an amount between 1.0% and 30.0%, inclusive, by weight of the composition, optionally between about 1.0% and 15%, inclusive; at least one reactive cross-linking component in an amount between 1.0% and 80.0%, inclusive, optionally between 10.0% and 40.0% inclusive; and at least one curing agent in an amount between 1.0% and 50.0%, inclusive, optionally between 10.0% and 40.0%, inclusive, by weight of the composition. The coating composition may be contained in a suitable carrier solvent. That solvent can be present in the coating composition in an amount between 10% and 50%, inclusive, optionally between 20% and 40%, inclusive, by weight of the composition. The coating composition in the reacted state will be the reaction product of the aforementioned first three components. The amount of solvent (if included) in the dried state also will decrease due to evaporation or removal of the solvent.

In the coating composition, the polymeric binder component employed herein is a resin that can be present at a molecular weight between oligomeric to medium molecular weight thermoplastic resin. In certain various embodiments, the molecular weight of the binder component can be between about 2000 and about 2,000,000. Suitable polymeric binders include but are not limited to polyvinyl acetals such as polyvinyl butyral (PVB), acrylic copolymers and terpolymers, thermoplastic polyurethanes, thermoplastic elastomer, polyvinyl alcohol (PVOH), acrylic or vinyl polymer or copolymer dispersions. Non-limiting examples of suitable acrylic copolymers and/or terpolymers include, but are not limited to, various substituted and unsubstituted methacrylic copolymeric and/or terpolymeric resins. Non-limiting examples of substituent groups can include C-1 to C-18 branched or unbranched alkyl groups. Optional polymeric binders can include monomers such as methyl acrylate and/or methyl methacrylate, where a methyl substituent can be a C-1 alkyl group. The acrylic resin materials can be monosubstituted or disubstituted or polysubstituted as desired. Where desired, the polymeric binder material can contain reactive functional groups that provide a dual functionality by undergoing at least some three-dimensional cross-linking. Non-limiting examples of suitable functional groups include various amines, hydroxyl compounds or carboxyl compounds. The reactive functionality, where present, is capable of cross-linking into a 3-dimensional network of bonds or can function as a curing agent.

Polymeric binders in the form of acrylic copolymers and/or terpolymers can be produced by any suitable means. It is contemplated that the material used can be the result of in situ polymerization of copolymers and various monomeric units including but not limited to short chain acrylates and methacrylates including but not limited to methyl, polymethyl, ethyl, polyethyl butyl and/or polybutyl acrylates and/or methacrylates. Suitable methacrylate resins will be those having a molecular weight between about 50,000 and 250,000 and an inherent viscosity of 0.1-0.4. Non-limiting examples of suitable methacrylate resin copolymers include various resins commercially available from Dianal America of Pasadena, Tex., U.S.A. under the trade name Dianal. A non-limiting example of such Dainal resin is BR 115 which is believed to be a poly-isobutyl methacrylate resin. Other examples of suitable methacrylate resins include polybutyl methacrylates such as those commercially available from Lucite International, of Hampshire, United Kingdom, under the trade name Elvacite. Also contemplated is the use of various methacrylate/butyl acrylate copolymers copolymerized with acrylic and/or methacrylic acid.

Polymeric binders may also be selected from polyethylene oxides or polyethylene imine resins, epoxy adducts, hydrocarbon resins, or synthetic hydrocarbon waxes. Also anticipated is the use of natural or synthetic rubbers or thermoplastic elastomers.

Suitable polyvinyl acetals for the polymeric binders are those formed by the acid catalyzed acetalization of poly(vinyl acetate). In certain embodiments, polyvinyl butyral can be successfully employed. It is contemplated that the polyvinyl butyrals having a hydroxyl content expressed as residual poly (vinyl alcohol) content between about 10% and about 15% as determined by IR analysis by test method WB-03-01-55; a molecular weight between about 30,000 and about 80,000 can be employed. Non-limiting examples of suitable material include Butvar resins such as Butvar H79.

The binder component can also include various engineered plastics such as polyimide resins, polyetherimide resins, polyamideimide resins, and the like. Suitable materials will have a molecular weight between about 500,000 and 800,000.

As mentioned above, the coating composition disclosed herein also can include a reactive component that is capable of cross-linking to form a 3-dimensional network of bonds. Examples of suitable compounds include, but are not limited to, epoxy resins, acrylate or methacrylate functional monomers or oligomers, isocyanate functional monomers or prepolymers and the like. Suitable epoxy compounds can include materials such as suitable epoxy novalac or EPON resins. Novalac are phenol formaldehyde resins in which the molar ratio of phenol to formaldehyde is less than one in which polymerization is brought about by acid catalysis. Suitable materials may have an epoxide equivalent weight between 160 g/eq to 250 g/eq.

The curing agent employed will be one that is selected to match the curing mechanism of the reactive compound. Non-limiting examples of suitable curing agents include various amines, peroxides or polyols. The curing agent is selected to match the reactive functionality of the reactive component (for example an amine can be used when the resin is an epoxy, a polyol can be used when the reactive component is an isocyanate monomer or prepolymers, etc).

Suitable amine curing agents can be selected from the group consisting of aliphatic, cycloaliphatic aliphatic modified amines and mixtures thereof. Non-limiting examples include material such as polyetheramines, aliphatic amines, modified and unmodified cycloaliphatic amines, polyamides and the like.

At least one of the reactive compound or the curing agent can be isolated, that is, physically separated from the associated components when the fastener or plug, both referenced to as a fastener herein, is in the uninstalled state. In at least one embodiment as disclosed herein, at least one of the reactive component or the curing agent is isolated or separated by microencapsulation. It is also contemplated that, in certain embodiments, the curing agent and/or at least one of the reactive compounds are both individually microencapsulated, separate from one another. That is, curing agents can be microencapsulated in a first group of microcapsules (curing agent micro capsules), and the reactive component can be separately microencapsulated in a second group of microcapsules (reactive component microcapsules). The microencapsulation can be such that, upon installation of a fastener or plug coated with the composition disclosed herein, the installation action, for example threading or press fitting the fastener into place, exerts sufficient force and/or pressure to rupture the microcapsules, resulting in the components inside the microcapsules being expelled therefrom, and no longer isolated in the microcapsules. The subsequent exposure of the previously isolated components starts activation of the cure process. In such instances, curing results in both thread-locking and sealing functionality. In many instances, both thread-locking and sealing functionality is obtained within 24 hours or less after installation.

In other embodiments, the reactive compound and the curing agent are not isolated or separated by microencapsulation. However, spatial, physical, structural separation is accomplished through deposition of the composition onto the fastener in separate layers or on different areas of the fastener and can be mixed and activated by installation of the plug or fastener by threading or pressing into the associated aperture. The separate layers can be disposed one on top of the other. Alternatively, the curing agent and reactive component can be disposed in different areas on the fasteners. For example, a curing agent can be disposed in a binder in a patch of coating on one side of the fastener, while the reactive component can be disposed in a binder in another, separate patch of coating on another side or surface of the fastener. With this construction, as the fastener is moved by rotation and/or sliding, the patches smear over one another so the respective components can mix, thereby ending the previous isolation thereof. In the above constructions, the various layers or patches are physically marred, gouged and/or smeared during installation, and thereby mixed, to activate the respective components.

Optionally, the composition as disclosed herein can include various defoamers, surfactants and the like.

In one embodiment, the expansion agent can be a microencapsulated methyl hydrogen silicone fluid that reacts to release hydrogen gas when exposed to select acids, bases or oxidizing agents. In certain embodiments activation of the methyl hydrogen silicone fluid can occur upon contact with a primary or secondary amine in present in the coating. Where an amine is present in the coating composition, it is contemplated that the amine may function as both an activator for the methyl hydrogen silicone fluid and a curative for the reactive compound such as epoxy or an acrylic material.

Optionally, the methyl hydrogen silicone fluid may be dispersed in the composition and the activating agent (acid, base, or oxidizing agent) is microencapsulated. In various other embodiments, the methyl hydrogen silicone fluid and the activating agent can be separated spatially by deposition onto the substrate in separate layers or on different areas of the associated fastener such that the materials are physically mixed and activated by installation of the fastener in the aperture or associated end use location.

Further optionally, expansion or foaming can be accomplished through the reaction with moisture of an isocyanate functional monomer, oligomer or prepolymer present as the reactive component. In certain embodiments, the isocyanate functional monomer, oligomer or prepolymer material is present in the coating in a microencapsulated form and upon rupture during the installation process, reacts with ambient moisture present in the coating or derived from the ambient air. This results in the release of $CO_2$ gas during cross-linking reactions to form a three-dimensional polymeric network. Such networks can be polyurea, polyurethane or the like depending on the factors such as the initial starting components, reaction conditions and the like. If sufficient ambient moisture is not present in the coating or air, water may be provided to the coating in a microencapsulated form.

The coating composition can also include various additional components added to impart or improve certain specific attributes or characteristics. These can include various lubricity enhancers as well as materials that can enhance water repellency. Such materials can include, but need not be limited to, waxes such as paraffin, polyethylene, polypropylene, carnauba, polytetrafluoroethylene or any combination of the aforementioned materials. When present, the wax or combination of waxes will be added as a small particle size component, for example less than 100 microns, more preferably less than 50 microns and even more preferably less than 10 microns and will typically be included from about 5 weight % or less to about 50 weight % or more.

The composition can also include various plasticizers employed to modify various characteristics including but not limited to coating hardness, add hydrophobicity, and/or lower breakaway torque and the like. Plasticizers suitable for use in the current embodiments include but are not limited to phthalates, trimellitates, benzoates, adipates, sebacates, maleates, citrates, epoxidized vegetable oils, sulfonamides, organophosphates, glycols/polyethers, polymeric plasticizers and polybutenes. It is understood that the type and level of plasticizer present in the composition shall depend on the performance criteria to be modified but when used the plasticizer will be present from about 5 weight percent or less to about 25 weight percent or more.

Various other components and additives can be present in the composition as disclosed herein. These include but are not limited to one or more metallic or mineral fillers may be incorporated into the coating. Fillers may also be employed for various objectives including, for example, cost control, rheology control, lubricity modification, as well as to prevent seizing or galling. It is also contemplated that fillers and other additives may be employed to assist with the rupture of microcapsules. Metallic fillers may include but are not limited to powdered nickel, copper, zinc or aluminum. Mineral fillers may include but are not limited to talc, calcium carbonate, silicates such as mica, wollastonite, titanium dioxide, quarts, fumed silica precipitated silica, graphite, boron nitride and the like. The type and level of filler will depend on the performance criteria to be modified but when used the filler will be present from about 5 weight percent or less to about 25 weight percent or more.

Where desired, the coating composition disclosed herein can include one or more pigment, dye or combination of the two to achieve a desired coating color. Coating colors are sometimes used to indicate a particular fastener sized or to indicate the function or functions of the coating. Suitable pigments and/or dyes will be those that are soluble or dispersible in the solvent system of the coating and be compatible with the chemistry of the coating. When present the level of dye or pigment will be from about 0.1% or more to 5% or less.

Other components that may be present in the coating composition as disclosed herein include minor amounts of antioxidants, inhibitors, surfactants, defoamers, dispersing aids, heat stabilizers, UV stabilizers and the like. When present such compounds are present in the coating composition in amounts less than 5% by weight.

A first specific embodiment is directed to an acrylic-based composition. The coating composition can contain a binder component selected from the group consisting of substituted or unsubstituted acrylate compositions alone or in combination with low molecular weight polyalkylene waxes or polyalkylene monomers. The binder component can be present in an amount between 20% and 45%, inclusive, by weight of the coating composition in the as-applied state, that is, when the coating is initially applied to a surface. The reactive component can be maintained in isolated relationship to the binder component and other components in the as applied state. The reactive component can be present in the composition in an amount between 40% and 70%, inclusive, by total composition weight. The reactive component can be one from the group that includes various methacrylate functional oligomers, methacrylate functional monomers or blends of the same in microencapulated state. In the as-applied state the composition also includes solvent in an amount sufficient to solubilize the binder component. Of course, the solvent can evaporate or otherwise be removed from the coating over time.

Optionally, when a solvent is removed from the coating composition, the resultant "dried" coating composition binder component can be present in an amount that is slightly greater (by some percentage of composition weight) than that binder component when the coating composition is in the "wet" or as applied state—primarily because there is less solvent. The reactive component can be maintained in isolated relationship to the binder component and other components in the dried state as well. The reactive component also can be present in the coating composition in an amount that is slightly greater (by some percentage of the composition weight) than that reactive component when the coating composition is in the "wet" or as applied state.

The composition also can include a suitable expansion agent as desired in applications where sealing is required such as when a large space is anticipated between the fastener and aperture. Expansion as the term is used in this disclosure includes but is not limited to foaming. The expansion agent can be any suitable material. The expansion agent will be present in the composition in a separated or sequestered orientation prior to insertion of the associated fastener or plug into the use position. Where expansion is desired, the composition can include an effective amount of an activator in an amount between about 1% and 10%, inclusive, by weight of the composition as well as a suitable a suitable blowing agent present in wholly or partially isolated relationship relative to other components in the composition. The blowing agent is present in an amount sufficient to generate gas in a manner and rate sufficient to be entrained in the polymeric material during cross-linking reaction. The expansion agent can be an alkyl hydrogen silicone fluid.

Without being bound to any theory, it is believed that the variations in the ratio of individual components of the coating composition can alter the adhesive and binding strength of the material that coats the substrate surface. In various formulations of this embodiment, the binder component can be composed of between 40% and 70%, inclusive, by weight acrylate resin, in combination with between 10% and 20%, inclusive, by weight alkylene wax and between and between 10 and 30%, inclusive, by weight alkylene monomer. It is contemplated that the binder component having greater concentrations of alkylene monomer with associated reduced concentrations of alkylene monomer can produce a material that, when applied and activated, can produce a material that can form a removable bond.

A second specific embodiment is directed to an epoxy based sealant. The binder component comprises between 5 and 15%, inclusive, by weight acrylate copolymer and optional amounts of additives such as pigments. The acrylate copolymer can be one that is selected from the group consisting of methacrylate copolymers, and acetal copolymers together with optional amounts of polyalkylene and polytetrafluoroethylene. The balance being an organic solvent suitable for dissolving the methacrylate copolymer. The resin component comprises microencapsulated epoxy novalac resin which can be in combination with a microencapsulated alkyl hydrogen silicone as the expansion agent. The two components can each comprise between 40% and 60%, inclusive, by weight of the total composition as applied. The activator component can comprise between about 1 and about 15%, inclusive by total weight of the composition as applied.

After application to a surface, the material solidifies with the evaporation of the solvent to form a solid coating layer in which the remaining components are admixed and the microencapsulated activator and microencapsulated resin component are distributed in a generally uniform manner. When applied to the fastener surface, the composition forms a solid layer that can react when exposed to mechanical forces such as shearing sufficient to rupture the microencapsulated components. Rupture of the hydrogen silicone microcapsules results in the generation of gases that are entrained in the polymerizing epoxy-methacrylate material triggered by the contact between the epoxy resin with the cyclohexylamine. The expansion rate is sufficient to produce an expanded sealant composition that adheres to both the fastener and the surrounding substrate.

Without being bound to any theory, it is believed that the adhesive strength of the epoxy-based composition can be controlled by choice and proportions of the coating components with binder components that comprise an acetal copolymer in combination with alkylene monomers and polyfluorinated copolymers producing a composition that exhibits characteristics of low friction and medium strength.

The composition as disclosed herein can be applied onto a suitable substrate material by any suitable means to form a coating layer. Where the composition is applied to fasteners such as bolts or threaded screws, it is contemplated that the material will act as a coating on at least a part of the elongated fastener body. The applied composition will solidify to a dried state upon evaporation of the solvent carrier and adhere to the associated substrate while maintaining at least one of the reactive components in isolated relationship relative to the composition and/or other components. In the dried state, the applied composition is dry to the touch. The isolated reactive component can typically be the reactive oligomer/monomer or the activator and, where present, at least one blowing agent component.

As noted above, the isolated component can be present, in the coating composition as applied and present on a substrate, in a layered relationship relative to other components, and/or in a separated patch area relationship relative to other components. Again, in the layered relationship, the isolation of the component can be accomplished by the isolated component being in one layer that is disposed separate from (e.g., on top of or below) other layers so that the isolated component does not mix with other components in the other layers. In the separated patch area relationship, the isolated component can be disposed in different areas on a substrate, separate and distal from another area upon which one or more other components are disposed.

Of course, the isolated component can be present, in the composition as applied, and as present on the substrate, in a microencapsulated state. Microencapsulation, as that term is used herein, encompasses materials and structures formed by any suitable process configured to be broken by mechanical forces such as shearing.

Example I

A shelf-stable composition that enables a coated fastener to be removable (i.e., it provides lower holding strength), is acrylic-based, and has the combined functionalities of expandable sealing and thread locking, is prepared in which 40 grams of poly-isobutyl methacrylate resin commercially available from Dianal America, Inc., under the trade name Dianal BR 115, 20 grams of powdered polyethylene wax commercially available under the trade name S-379H commercially available from Shamrock Technologies of Newark, N.J., U.S.A., 2.5 grams of TiO2, 0.1 gram pigment, 16 grams of polybutene commercially available under the trade name Indopol 1-14 from INEOS Oligomers of League City, Tex., U.S.A., and 20 grams of a suitable activator such as an amine activator such as Baxxodur EC 301 are added to 120 grams of toluene and mixed under high shear until the methacrylate resin is completely dissolved.

To this mixture is added 132 grams of microencapsulated methacrylate functional oligomer/monomer blend of ethoxylated bisphenol A dimethacrylate and SR399, 10 grams of microencapsulated benzoyl peroxide and 5.3 grams of a microencapsulated methyl hydrogen silicone fluid commercially available from Genesee Polymer of Burton, Mich., U.S.A., under the trade name GP236. The resulting composition was mixed thoroughly with a low shear paddle blade so as to not prematurely rupture any micro-encapsulated components. After mixture is complete, the resulting material is transferred to a storage vessel. The material is found to be shelf-stable for an interval of at least 6 months.

Example II

A portion of the material prepared in Example I is applied by flow coating to the threaded surface of M10×1.5 bolts with a zinc phosphate surface and M10×1.5 bolts with a zinc plated surface and solvent was removed at 70° C. for 5-10 minutes. The applied material has a thread fill of about 30% or less, up to 100%, following removal of the solvent. The applied material adheres to the fastener surface as a solid layer. Fasteners coated with this formulation produce the following results when fitted with a matching M10 zinc plated nut: break away torque of 20.4 in·lb and 132 in·lb on the zinc plated and zinc phosphate surfaces respectively after 24 hours of cure. Prevailing off torque of 18 in·lb and 70 in·lb were measured on the zinc plated and zinc phosphate surfaces respectively after 24 hours of cure. The zinc plated M10 bolts with the expandable coating sealed against pressures of at least 120 psi after 24 hours of cure.

Example III

A shelf-stable composition that enables a coated fastener to be to be relatively permanently installed (i.e. it provides higher holding strength), is acrylic-based, and has the combined functionalities of expandable sealing and thread locking, is prepared in which 40 grams of an poly-isobutyl methacrylate resin (a binder), 10 grams of powdered polyethylene wax (a lubricant), 2.5 grams of TiO2, 0.1 gram pigment, 6 grams of polybutene and 20 grams of amine activator commercially available under the trade name Baxxodur EC 301 from BASF of Florham Park, N.J., U.S.A., were add to 120 grams of toluene (a solvent) and mixed until the methacrylate polymer is completely dissolved. To this mixture is added 132 grams of microencapsulated methacrylate functional oligomer/monomer blend (a microencapsulated reactive agent), 30 grams of microencapsulated benzoyl peroxide (a microencapsulated curing agent) and 5.3 grams of a microencapsulated methyl hydrogen silicone fluid (a microencapsulated expanding agent). The resulting composition was mixed thoroughly with a low shear paddle blade so as to not prematurely rupture any micro-encapsulated components. After mixture is complete, the resulting material was transferred to a storage vessel. The material is found to be shelf-stable for and interval of at least 6 months.

Example IV

A portion of the material prepared in Example III is applied by flow coating to the threaded surface of M10×1.5 bolts with a zinc phosphate surface and M10×1.5 bolts with a zinc plated surface and solvent was removed at 70° C. for 5-10 minutes. The applied material has a thread fill of about 30 or less up to 100% following removal of the solvent. The applied material adheres to the fastener surface as a solid layer. Fasteners coated with this formulation produce the following results when fitted with a matching M10 zinc plated nut: break away torque of 70 in·lb and 104 in·lb on the zinc plated and zinc phosphate surfaces respectively after 24 hours of cure. Prevailing off torque of 18 in·lb and 96 in·lb were measured on the zinc plated and zinc phosphate surfaces respectively after 24 hours of cure. The zinc plated M10 bolts with the expandable coating sealed against pressures of at least 120 psi after 24 hours of cure.

Example V

A shelf-stable composition that enables a coated fastener to be removable (i.e., it provides lower holding strength), is epoxy-based, and has the combined functionalities of expandable sealing and thread locking, is prepared by adding 8 grams of a methacrylate copolymer (a binder) commercially available from Lucite International, Inc., under the trade name Elvacite 2044, 10 grams of methylene di(cyclohexylamine) under the trade name Amincure PACM from Air Products and Chemicals, Inc. of Allentown, Pa., U.S.A., and 0.18 grams of green pigment to 78 grams of toluene (a solvent) and mixed under high shear until the acrylic copolymer was dissolved.

To this mixture were added 8 grams of a microencapsulated methyl hydrogen silicone fluid (an expanding agent) and 90 grams of a microencapsulated epoxy novalac resin (a reactive component). The resulting composition was mixed under low shear approximately 5-10 minutes. After mixture is complete, the resulting material is transferred to a storage vessel. The material is found to be shelf-stable for and interval of at least 6 months.

Example IV

A portion of the material prepared in Example V is applied to the surface of the threaded surface of M10×1.5 dry phosphate coated bolts and M10×1.5 bolts with a zinc plated surface and solvent was removed at 70° C. for 5-10 minutes. The applied material has a thread fill of about 30% or less, up to 100%, following removal of the solvent. The applied material adheres to the fastener surface as a solid layer. Fasteners coated with this formulation produce the following results when fitted with a matching M10 zinc plated nut: break away torque of 65 in·lb and 75 in·lb on the zinc plated and zinc phosphate surfaces respectively after 72 hours of cure. Prevailing off torque of 52 in·lb and 50 in·lb were measured on the zinc plated and zinc phosphate surfaces respectively after 72 hours of cure. The zinc plated M10 bolts with the expandable coating sealed against pressures of at least 115 psi after 72 hours of cure.

The process was repeated for M22 zinc plated pipe plugs. After 72 hours of cure the plugs sealed to a pressure of at least 115 psi and had a break torque of 118 in·lb and a prevailing off torque of 100 in·lb. The expandable thread sealant maintained its sealing capabilities and break away torque values after exposure to 150° C. for 500 hours.

Example VII

A shelf-stable composition that is epoxy-based, and has the combined functionalities when on a fastener of lubricating (or enhancing low friction movement of a fastener), expandable sealing and thread locking (medium strength), is prepared by adding 7 grams of polyvinyl butyral (PVB) (a binder) commercially available under the trade name BUTVAR 79H, 10 grams of methylene di(cyclohexylamine) commercially available from Air Products and Chemicals, Inc., under the trade name Amicure PACM, 20 grams of a small particle size polytetrafluoroethylene (PTFE), SST3 commercially available from Shamrock Technologies, 18 grams of a small particle size polyethylene, S-379H also commercially available from Shamrock Technologies and 0.1 grams of a silicone based defoamer having the trade name Surfynol DF58 commercially available from Air Products and Chemicals, Inc. were added to 72.5 grams of toluene and mixed under high shear until the PVB was dissolved.

The prepared resulting solution has 8 grams of a microencapsulated methyl hydrogen silicone fluid (an expanding agent) and 65 grams of a microencapsulated epoxy novalac resin (a reactive agent) added to it. The resulting composition was mixed under low shear for an interval of about 5-10 minutes. After mixture is complete, the resulting material is transferred to a storage vessel. The material is found to be shelf-stable for and interval of at least 6 months.

Example VIII

A portion of the material prepared in Example VII is applied to the surface of the body of a threaded fastener by flow coating to achieve a thread fill between 30%-80% and the applied material is allowed to solidify by evaporation of the solvent.

Fasteners coated with this formulation produced the following results with a matching M10 dry phosphate coated nut: K-value of 0.114; break away torque of 137 in·lbs and prevailing off torque of 40 in·lbs after 24 hours of cure. The M10 bolts sealed against pressures from 20-115 psi after 1 hour. M22 plugs coated in a similar manner provided a seal up to 115 psi after 24 hrs.

Example IX

A composition that is epoxy-based, and has the combined functionalities when on a fastener of lubricating (or enhancing low friction movement of a fastener), expandable sealing and thread locking (low strength so the fastener is removable), is prepared by adding 11.5 grams of a 50% solution of polyethylene imine (a binder), PEI, to 33.64 grams of de-ionized water along with 0.29 grams of Surfynol CT-136 and 16.1 grams of polypropylene wax blend (a lubricant) with blending and mixing for 40 minutes. The PEI employed in this example is commercially available from BASF, Inc. under the trade name Lupasol P. The propylene wax blend is commercially available from Shamrock Technologies under the trade designation S-363. After the mixing step is completed, 0.46 grams of Surfynol DF-110 is added along with 18.98 grams of polyethylene wax designated as s-379H and 0.29 grams of an anionic surfactant to be followed by an additional 40 minutes of mixing. After the mixing step is completed, 2.59 grams of fumed silica is added to be followed by an additional 30 minutes of mixing. The fumed silica can be that which is commercially available from Evonik under the trade name Aerosil R200. The resulting material is thinned with 31.17 grams of de-ionized water. The resulting mixture is mixed under low shear while adding 10 grams of a microencapsulated epoxy novalac resin and 2 g of a microencapsulated methyl hydrogen silicone fluid.

Example X

The composition prepared according to Example IX is coated onto a series of M10×1.5 fasteners and gives the following performance: K-value of 0.105; break away torque of 28 in·lbs and prevailing off torque of 26 in·lbs after 24 hours of cure. The material sealed up to pressures of 115 psi after 1 hour of cure.

Example XI

A coating composition that has the combined functionalities when on a fastener of low strength masking, and expandable sealing, is prepared by dissolving 7.5 grams of a SEBS block copolymer such as KRATON G1652M in 22.5 grams of toluene. To this solution were added 5.1 grams of methylene di(cyclohexylamine) along with 5 grams of a microencapsulated methyl hydrogen silicone fluid and 5 grams of microencapsulated benzoyl peroxide. An additional 11.1 grams of toluene is added to adjust viscosity.

The material is coated on to an M10 dry phosphate coated fastener. Application of a nut to the fastener is accompanied by mild expulsion of material from the area between the nut and fastener.

Example XII

An expandable, epoxy based coating composition with combined functionalities of expandable sealing, thread locking and anti-seizing is prepared by dissolving or dispersing 40.1 grams of polyethyleneimine, 7.3 grams of powder boron nitride, 39 g of a 325 mesh mica, and 16.8 grams of graphite in 79.2 g of deionized water. Optionally, defoamers and wetting agent may be added to assist dispersion and control foaming. Under low shear were added 30 grams of microencapsulated epoxy resin along with 8 grams of a microencapsulated methyl hydrogen silicone fluid.

The resulting coating was applied to M10 threaded fasteners followed by drying at 70 C for 10 minutes. The coated fasteners were capable of sealing to a pressure of 115 psi within 1 hour or less of installation. M22 threaded plugs coated in a similar manner were capable of sealing to a pressure of 115 psi within 24 hours or less of installation.

To demonstrate the anti-seizing capability of the coating, M10 coated fasteners were installed in a threaded steel block to a torque value of 400 in·lb. This assembly was allowed to cure for 24 hours and then subjected to a temperature of 650° C. for 24 hrs. After cooling the assembly for an additional 24 hours break away and removal torque values ranged from 150-225 in·lb.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A fastener comprising:
   an elongated body;
   a head joined with the body, each of the head and body having an outer surface, at least one of the elongated body and the head including a coating composition disposed in overlying layered relationship relative to a least portion of the outer surface, the coating composition comprising:
   a binder component composed of a polymeric resin present in the composition at a concentration between 1.0% and 30.0%, inclusive, by total composition weight, wherein the binder component is composed of at least one solvent dispersible compound, and wherein the polymeric resin includes at least one of acrylic copolymers and terpolymers, thermoplastic polyurethanes, thermoplastic elastomer, and acrylic or vinyl polymer or copolymer dispersions;
   a reactive cross-linking component present in the composition in an amount between 1.0% and 80.0%, inclusive, by total composition weight;
   at least one curing agent; and
   an expansion agent isolated from the binder component, the reactive cross-linking component and the at least one curing agent,
   wherein at least one of the curing agent and the reactive cross-linking component are present in the composition in a position isolated from at least one of the binder component and one another.

2. The fastener of claim 1 wherein at least one of the curing agent and the reactive cross-linking component are present in a physically layered relationship relative to at least one of one another and the binder component.

3. An assembly comprising the coated fastener of claim 2 in inserted combination with an aperture defined in a member, wherein the coating composition layer is interposed between the outer surface of the fastener and the member.

4. The fastener of claim 1 wherein at least one of the curing agent and the reactive cross-linking component are present in separate patches of coating that are physically disposed in different areas on the threads of the fastener so that when the fastener is installed, the separate patches smear and intermix with one another to initiate cross linking of the reactive cross-linking components.

5. The fastener of claim 1 wherein the curing agent is microencapsulated in a plurality of curing agent microcapsules, wherein the reactive cross-linking component is microencapsulated in a plurality of reactive cross-linking component microcapsules that are distinct from the curing agent microcapsules, wherein the curing agent microcapsules and reactive cross-linking component microcapsules physically isolate the curing agent and the reactive cross-linking component respectively from at least one of the binder and one another.

6. The fastener of claim 5 wherein the curing agent microcapsules and reactive cross-linking component microcapsules are adapted to rupture, expelling the contents thereof, when subjected to forces upon installation of the fastener.

7. The fastener of claim 1 wherein the reactive cross-linking component is at least one of epoxy resins, acrylate functional monomers, acrylate oligomers, methacrylate functional monomers, methacrylate oligomers, isocyanate functional monomers, isocyanate prepolymers and mixtures thereof.

8. The fastener of claim 7 wherein the reactive cross-linking component is a methacrylate functional oligomer/monomer blend.

9. The fastener of claim 8 wherein the reactive cross-linking component is microencapsulated.

10. The fastener of claim 1 wherein the coating composition is formulated to provide a combination of functionalities being at least two of locking, expanding, sealing, lubricating, masking, anti-galling and anti-seizing.

11. The fastener of claim 1 wherein the coating composition is produced by a process, the process comprising bringing the isolated component, being at least one of the curing agent or the reactive cross-linking component, into reactive contact with the other components of the coating composition and allowing the composition to expand and cure for an interval, whereby the composition provides multiple functionalities being sealing, thread locking and expansion.

12. The fastener of claim 1 wherein the fastener is produced by a process, the process comprising:
    dissolving a thermoplastic polymeric binder component in a solvent to provide the binder component at a final composition weight of between 1% and 30%, inclusive, in the coating composition to be applied;
    admixing a portion of at least one alkylene monomer together with an activator into the solvent to from a binder solution mixture such that the alkylene monomer is present in the coating composition to be applied;
    introducing a portion of a thermoplastic oligomer and monomer blend into the binder solution to provide a final concentration between about 1% and about 80.0%, inclusive;
    introducing at least one expansion agent into the composition in a manner that maintains at least one of the expansion agent and the thermoplastic oligomer and monomer blend in isolated relationship in the composition; and
    applying the composition to the at least one outer surface of the fastener,
    wherein upon the inserting, the reactive cross-linking component becomes exposed to the binder component and forms three dimensional bonds in the presence of the binder component and the curing agent.

13. The fastener of claim 1 wherein the reactive cross-linking component is at least one of epoxy resins, acrylate functional monomers, acrylate oligomers, methacrylate functional monomers, methacrylate oligomers, isocyanate functional monomers, isocyanate prepolymers and mixtures thereof.

14. The fastener of claim 1 wherein the curing agent is at least one of polyols, peroxides, aliphatic, cycloaliphatic aliphatic modified amines and mixtures thereof.

15. The fastener of claim 1 wherein the coating composition comprises an expansion agent which is microencapsulated methyl hydrogen silicone fluid.

16. A method for producing a sealed junction between a fastener and an associated aperture, the method comprising the step of:
    inserting a fastener into shearing engagement with a corresponding surface of the aperture, the fastener having at least one coating composition adhering to an outer surface of at least one of the body or the head, the coating composition comprising:
        a binder component composed of a polymeric resin present in the composition at a concentration between 1.0% and 30.0%, inclusive, by total composition weight, wherein the binder component is composed of at least one solvent dispersible compound; and wherein the polymeric resin includes at least one of acrylic copolymers and terpolymers, thermoplastic polyurethanes, thermoplastic elastomer, and acrylic or vinyl polymer or copolymer dispersions;
        a reactive cross-linking component present in the composition in an amount between 1.0% and 80.0%, inclusive;
        at least one curing agent; and
        at least one expansion agent isolated from the binder component, the reactive cross-linking component and the at least one curing agent,
    wherein at least one of the curing agent or the reactive cross-linking component are present in the composition in a position isolated from at least one of the binder component and one another.

* * * * *